June 17, 1941.  E. J. LOCKWOOD ET AL  2,246,372
VARIABLE SPEED ALTERNATING CURRENT MOTOR
Filed Jan. 6, 1939  2 Sheets-Sheet 1

INVENTOR
Edwin J. Lockwood & John H. Foster
BY
Watson, Bristol, Johnson & Leavenworth
ATTORNEYS

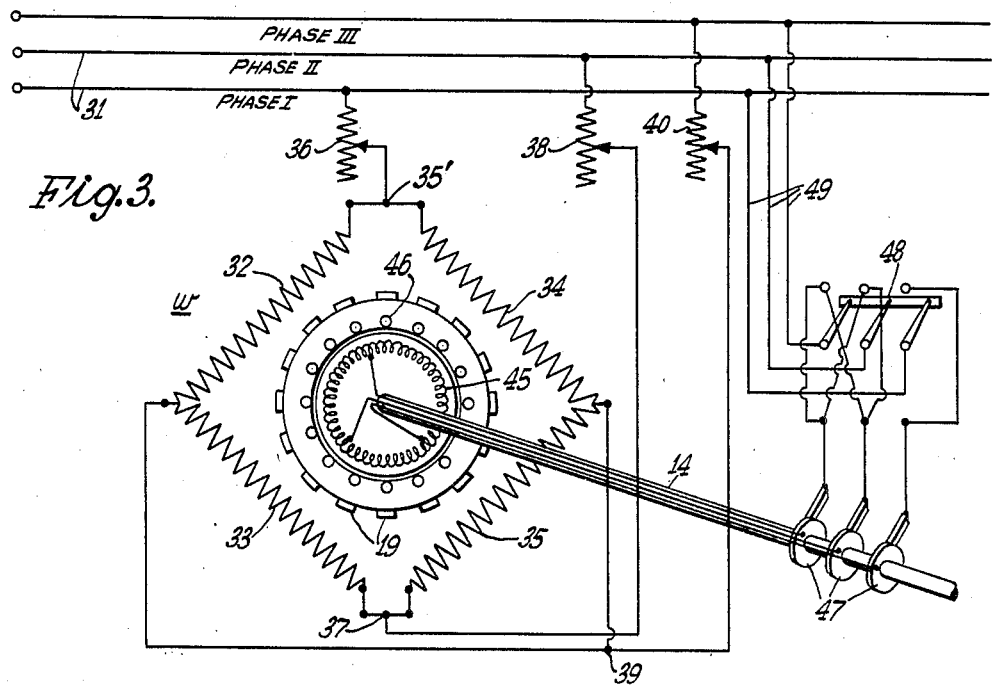
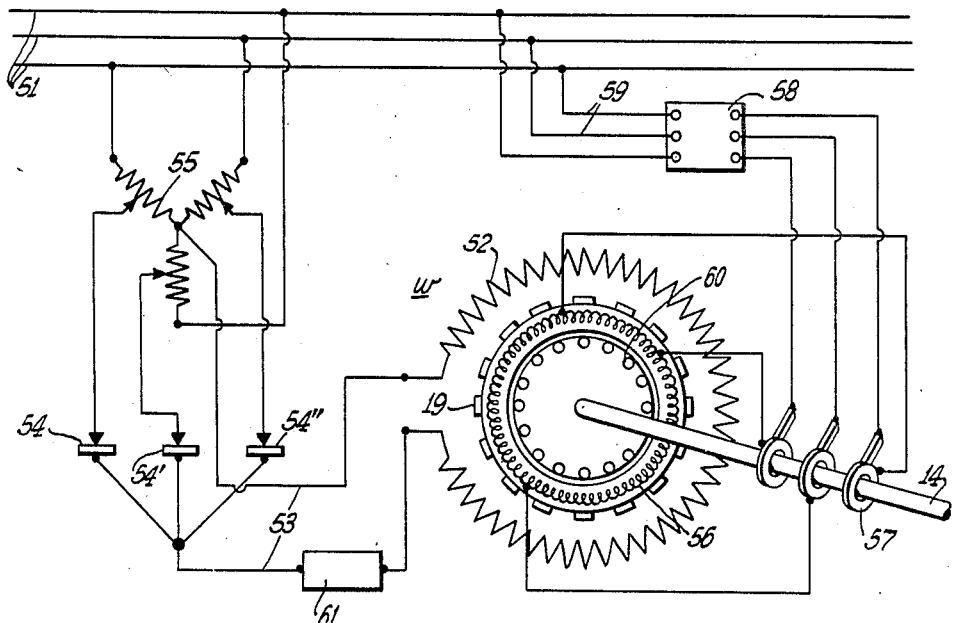

Patented June 17, 1941

2,246,372

UNITED STATES PATENT OFFICE 2,246,372

VARIABLE SPEED ALTERNATING CURRENT MOTOR

Edwin J. Lockwood, Peekskill, and John H. Foster, Merrick, N. Y.

Application January 6, 1939, Serial No. 249,546

3 Claims. (Cl. 172—274)

This invention relates to dynamo electric machines which are adapted for motor operation, when energized with alternating current and have a variable speed characteristic.

More particularly, this invention relates to an alternating current motor of a type normally possessing constant speed but is constructed to embody means whereby the speed may be changed at will over a relatively wide range.

The invention has for its object, generally, the provision of an improved alternating current motor of the character indicated which incorporates, conveniently and economically, means for achieving variable speed control of the motor over a desired range.

More specifically, the object of the invention is to provide an alternating current motor of the induction type with means which is capable of varying the speed over substantially a hundred per cent range.

Still another object is to provide an alternating current motor with simple and inexpensive speed controlling means comprising a winding that is built into the machine and is adapted for varying the speed by imparting a variable braking action, together with a cooperating motor member that is ordinarily stationary, such as a stator, but is designedly mounted for rotation and arranged to be braked in a motor of the present invention.

Still another object is to provide an alternating current motor of the induction type with a member capable of magnetically retarding a conventional stator element in varying degrees, which element is rotatably mounted and, when held in a stationary position, causes the motor to operate and deliver substantially its full rated speed, but when actual slippage is made to take place accomplishes a reduction of the rated motor speed.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention, reference should be had to the following detailed description taken in connection with the accompanying drawings, in which:

Fig. 3 is a similar diagrammatic view showing an arrangement of windings used in a motor when energized from a poly-phase alternating current supply, for accomplishing speed variation in accordance with the invention;

Fig. 4 shows a diagrammatic view of still another modified form of alternating current motor which has a variable speed characteristic in accordance with the invention.

Figure 1:
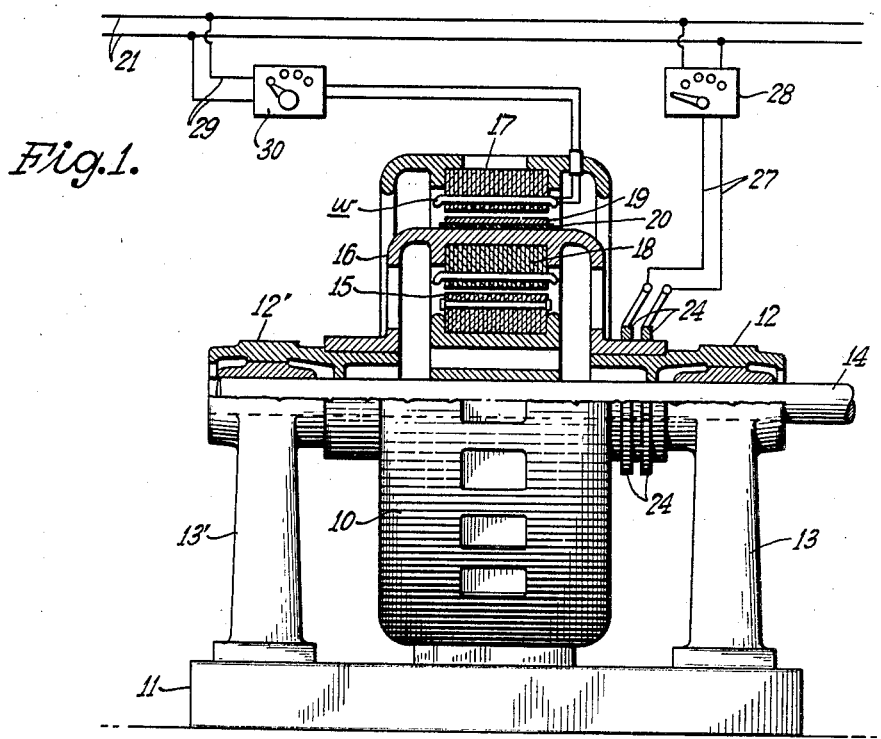
Fig. 1 is a view, having the upper portion in section and the lower portion in elevation, showing a dynamo electric machine constructed to incorporate means imparting a variable speed characteristic in accordance with the invention.

Induction motors have long been regarded as one of the simplest types of alternating current motors. A certain small range of speed variation has heretofore been achieved with such motors by inserting resistance in series with the rotor windings. Such speed regulation, however, does not have the flexibility and wide range usually desired of variable speed electric motors. Induction motors in consequence are regarded as essentially constant speed machines, i. e., such motors are said to have a so-called "shunt characteristic." To achieve speed regulation in induction motors over a wider range than can be accomplished in the manner above indicated, it has been proposed to employ auxiliary dynamo electric machines which generate and supply a controlling current, such auxiliary machines generally being in the form of frequency changing sets for the purpose of supplying an alternating current of another frequency to achieve speed regulation. Such auxiliary apparatus is not only expensive, but occupies additional space that limits the application of speed control to induction type alternating current motors in this manner.

Another form of speed control for induction type motors involves the use of an intermediate member which carries windings within and without the same, one of the windings cooperating with a winding either on the rotor or on the stator to produce a speed changing torque. A speed control accomplished in this manner is shown in the U. S. patent to Mavor 912,144. Such speed control as is thus provided imparts additional torque which either adds to the otherwise normal speed or subtracts therefrom so that the motor may be said to have three running speeds. Such an arrangement is relatively inflexible and does not provide the range of speeds desired for ordinary industrial purposes.

In accordance with the present invention, an induction type alternating current motor is arranged to have a relatively wide and flexible speed range by changing an ordinarily stationary member into a rotatable member and providing it with magnetizable pole portions which are adapted to form local magnetic circuits in conjunction with similar pole portions on a cooperating member of the motor. To enable these portions to cooperate and brake or retard the motion of such rotatable member, a magnetizing winding is provided, and arranged to induce magnetic flux in the pole portions, the flux having a maximum value that produces a braking torque capable of producing substantially zero slippage for the rotatable member. A control device is also provided for regulating the current in this magnetizing winding together with the resulting magnetic flux so that actual slippage may be made to take place. This slippage preferably takes place over the whole speed range, i. e., a slippage of value from zero to 100% of the rated speed is provided. In this way a variable speed characteristic is imparted to an induction type motor whereby it has the flexibility of a direct current variable speed motor.

Referring now to the drawings, and particularly to Fig. 1, a stationary frame 10 is shown mounted on a base 11 which has bearing housings 12 and 12' mounted respectively on pedestals 13 and 13' on the base 11. A shaft 14 is shown journaled in the bearings 12 and 12' and has a rotor 15 mounted thereon within the stationary frame. An intermediate frame 16 is journaled on the bearings 12 and 12', and extends through the clearance space about the rotor 15. This intermediate frame, when rotating, also clears a magnetizable member 17 which is rigidly supported in the frame 10 about the rotor 15.

Figure 5:
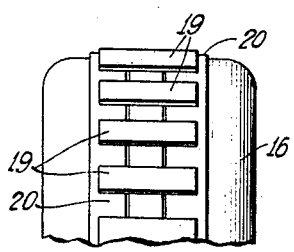
Fig. 5 is a fragmentary view showing certain details.

The intermediate frame 16 has mounted in it a laminated magnetic member 18 which surrounds the rotor 15 and serves as a standard motor member, such as a stator, which is adapted to cooperate with the rotor 15. On the outside cylindrical surface of the intermediate frame 16 are secured a plurality of magnetic laminations 19 serving as pole portions, which laminations are advantageously laid axially and equally spaced; a preferred arrangement being shown in Fig. 5. A magnetic shield comprising one or more highly conducting rings 20 is preferably interposed between the magnetic laminations 19 and the outer surface of the intermediate frame 16; the laminations 19, in such case, being secured to the rings 20. These rings may, of course, be of any suitable material, for example, of brass or copper. The laminations 19 are also made of a suitable magnetic material, for example, of so-called "transformer" iron, having a relatively high permeability.

The magnetizable member 17 in the frame 10 is preferably formed with slots on the interior surface and shaped to provide a series of salient pole portions which cooperate with the laminations 19; the latter preferably corresponding in number to the pole portions on the member 17 in order to serve as magnetic bridges or armatures forming local magnetic circuits with the poles on the magnetizable member 17. A magnetizing or energizing winding for these local magnetic circuits is shown at w and is laid in the slots on the member 17 in a manner hereinafter more particularly described.

The relatively movable members 15 and 18 are also provided with slots adapted to receive windings which are to be energized with alternating current for producing motor propelling forces therebetween, whereby the rotor 15 may drive the shaft 14 and deliver power. Any suitable windings for the purpose may be provided on the members 15 and 18, respectively; for example, the member 15 may be wound with a four-pole single phase induction motor winding, there being shading rings or windings also associated with the poles. A short circuited squirrel-cage winding is then advantageously provided in the member 18. A schematic arrangement of windings of this character is shown in Fig. 2.

Figure 2:
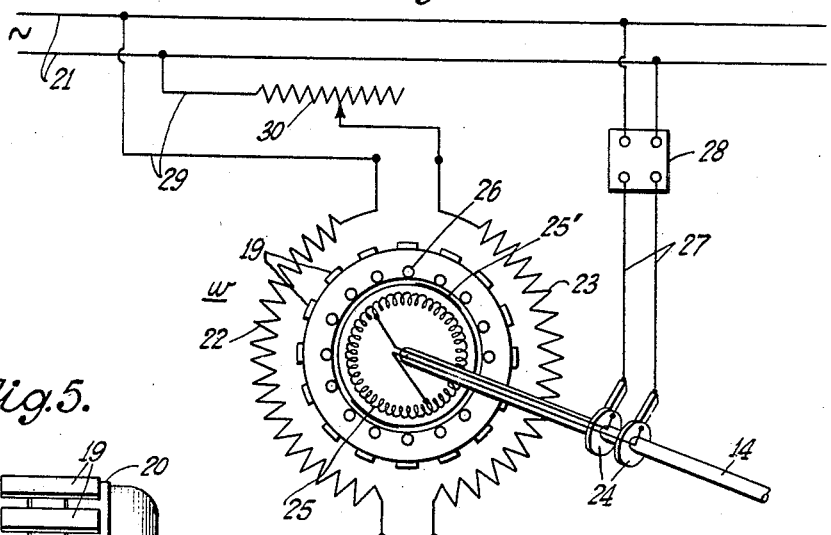
Fig. 2 is a diagrammatic view showing an arrangement of windings used in a motor when energized with single phase alternating current for accomplishing speed variation in accordance with the invention.

In Fig. 2, single phase alternating current supply mains are shown at 21. Th winding w is shown as composed of two portions 22 and 23, which are laid in the slots of the magnetizable member 17 so as to provide instantaneous similar magnetic poles, the poles being adapted to buck each other, thereby tending to neutralize any torque that might otherwise be imparted to the magnetic laminations 19 on the intermediate member or frame 16. This intermediate member is here shown as provided internally with a squirrel-cage winding 26, while the rotor on shaft 14 has a mesh-connected winding 25 arranged to give two poles, and has shading windings 25'. The shaft 14 is shown as provided with a pair of slip-rings 24 connected to supply current to the rotor windings. The supply mains are tapped by conductors 27 to supply current to the slip-rings 24, and have a control element 28 in series therewith. In parallel with conductors 27 a second pair of conductors 29 are tapped into the mains 21 and supply current to the portions 23 and 24 of the winding w, which portions are in series. In series with conductors 29 and with the windings 22—23 is also connected a variable resistance control element 30, which is adapted to vary the amount of current supplied for energizing the windings 22—23 and thereby impart the variable speed characteristic desired.

In operation, current to the motor is supplied simultaneously through the conductors at 27 and 29. When it is desired to have the motor run at the full rate of speed, the control resistance at 30 is completely cut out. In this arrangement, it is seen that single phase alternating current is supplied to the rotor windings 25 which cooperate with the squirrel-cage winding 26 to produce motor propelling forces between the rotor and the intermediate frame. Consequently, the shaft 14 delivers torque and turns.

When a maximum valued current is passing through the windings 22—23, a maximum valued flux is induced in the local magnetic circuits in the member 17 which passes through the laminations 19 whereby the same are drawn into positions adapted to bridge the gaps between poles and are held tightly in such positions so that there is zero slippage between the intermediate frame and the magnetic member 17 in the frame 10. Thus shaft 14 is driven at the full rated speed of the motor. Should the resistance at 30 be now gradually cut in, it is seen that the energizing current passing in the windings 22—23 is reduced and a certain amount of slippage is permitted to take place. The magnetic laminations 19 when slipping from pole to pole on the member 17 do so at first at a relatively slow rate, the rate of speed of slippage subtracting from the rated speed of the shaft 14 so that a less resultant speed is delivered. By increasing the value of the resistance at 30 in series with the windings 22—23, the amount of slippage may be increased until a slippage substantially equal to 100% of the rated speed takes place and the shaft 14 comes to a standstill.

By this arrangement for magnetically braking a stator member of a motor of the induction type, not only is a variable speed characteristic imparted, but the motor is made substantially safe from overload. Should the motor suddenly be thrown onto full load, it is seen in consequence that the rotor windings 25 do not draw the heavy lagging current commonly experienced in starting induction current motors under load. Instead, a certain amount of slippage takes place between the intermediate member and the braking winding so that the starting current is quickly brought to a small value substantially in phase with the applied E. M. F. This is a valuable feature, tending to reduce operating costs and the penalties imposed by companies operating central stations on users for drawing lagging currents which otherwise operate to overload the central station supply mains.

In Fig. 3 an arrangement of windings imparting a variable speed characteristic to an alternating current motor is shown which is supplied from three-phase mains, shown at 31. Here the braking winding $w$ is indicated as comprising four portions, denoted 32, 33 and 34, 35. Portions 32—33 are connected as an open-delta winding disposed in the slots of the member 17 and extend about one-half the circumference of the stationary frame. The portions 34—35 are also connected in open-delta and are disposed in the slots extending about the other half of the stationary frame. These two open-delta portions are arranged to give bucking rotating effects. The winding portions 32 and 34 are connected to have a common terminal 35' which is connected through a variable control resistance 36 to phase I of the supply buses 31. Windings 33 and 35 are similarly connected to have a common terminal 37 which is connected through a variable control resistance 38 to phase II. The mid-points of each delta section also have a common terminal 39 which is connected through a variable control resistance 40 to phase III.

Here again the rotor on shaft 14 is shown provided with a mesh-connected winding arranged to be supplied with energizing current through slip-rings 47 on the shaft 14. The intermediate member carries a squirrel-cage winding 46 on its magnetizable portion, cooperating with the winding 45 to generate a motor propelling force. A control device is shown at 48 for the current supplied to the sliprings 47. Conductors 49 are shown tapped to the supply mains 31 and leading to the control device 48.

The operation of this modification is substantially like that shown in Fig. 2, current being supplied to both the windings at $w$ and the motor windings when the motor is to deliver full rated speed through the shaft 14, i. e., the resistance at 36, 38 and 40 are all cut out while the control device at 48 supplies a full valued running current to the slip-rings at 47.

When a current of maximum value is passing through the open-delta connected winding portions 32—33, a rotative torque is imparted to the intermediate member. A rotative torque of equal and opposite magnitude, however, is imparted by the open-delta windings 34—35. The bucking torques are seen to supplement the locking effects of the magnetic circuits so that zero slippage between the intermediate member and the stationary frame of zero value is readily obtained. By increasing the values of the control resistance in series with the conductors leading to the windings $w$, the braking effect is reduced and slippage permitted so that a variable speed characteristic is imparted.

Where it is not essential that a balanced load be at all times drawn from the supply mains 31, a single control resistance may be employed for reducing the current passing in one of the open-delta winding sets. In this way, slippage in a given direction may be achieved through the torque effect of the fully energized section. This torque effect may, of course, be reversed by providing suitable reversing connections.

In the form of motor, shown in Fig. 3, the control device at 48 may be readily made to include a reversing switch so that the rotor windings 45 may generate torque in the reverse direction, and reverse the motor when desired.

In this form of motor, the slippage feature not only prevents the motor from being overloaded, or drawing heavy lagging currents when started, but also permits the motor to be reversed at full speed without the liability of drawing unduly heavy lagging currents.

In the modified form of the invention, shown in Fig. 4, the three-phase alternating current supply mains are shown at 51 for energizing an induction type alternating current motor, in which the magnetizing winding $w$ producing the braking effect is arranged for energization by direct current. In such case, the winding $w$ is preferably laid in the slots of the magnetizable member 17 so as to produce a series of alternate north and south poles which are respectively bridged by the magnetic laminations 19 on the intermediate frame. The magnetizing winding is shown at 52 and has its terminals connected by conductors 53 to a suitable rectifying device that is connected to the mains 51 and converts the alternating current into a unidirectional current.

Any suitable rectifying device adapted to this end may be employed. Since, however, the winding $w$ if of a sufficient number of turns may be energized with a current of relatively small value, rectifiers which inherently pass small currents may be used, for example, dry contact rectifiers, as shown at 54, 54' and 54'' which are connected in parallel to one of the conductors 53. Since such rectifying devices are also essentially low voltage devices, they are advantageously supplied, respectively, by conductors tapped into the windings of a three-phase star-connected auto-transformer or reactor 55, the neutral point of the reactor being connected to the other conductor at 53. The windings of the reactor 55 are connected, respectively, to the phases of the supply mains 51.

In the modification, shown in Fig. 4, the magnetic member on the intermediate frame is provided with a delta-connected winding 56 which is tapped and has conductors leading to slip-rings 57 that are supplied with current through a control device 58 by conductors 59 leading from the mains 51. In this instance, the slip-rings 57 rotate with the intermediate frame, and are hence rotatable on the shaft 14 which carries the rotor. By this arrangement the rotor has a suitable winding cooperating with the winding 56, which may be, for example, a squirrel-cage winding, as shown at 60.

In operation, the variable speed characteristic of this last form of motor is imparted by the direct current circulated in the magnetizing winding 52. The control of the current in this winding may be effected in any convenient manner, for example, by means of a control rheostat, as shown at 61, in one of the conductors 53. The motor control device 58 may also include a reversing switch, when desired.

While the magnetizing or braking winding, shown generally at $w$ in the present drawings, has been described as disposed in the magnetizable member on the frame 10, it will be understood that this is a matter of convenience. This is also true for the magnetizable member producing the braking effect which has been shown as placed in the outside stationary frame because such arrangement gives a relatively long radius to the braking force producing braking torque whereby a relatively great braking effect for a given current energizing the winding $w$ is provided. The invention, however, is obviously not limited to such positions of either the magnetizing winding or of the magnetizable member which applies the braking torque since the arrangements are obviously reversible. Similarly it will be understood that the rotor and stator members of the induction motor proper which have been described as employing cooperating mesh-connected and squirrel-cage windings may employ other arrangements of induction motor windings; for example, star-connected windings may be substituted. Also sources of alternating current other than single phase, or three-phase, may be employed, such as quarter-phase, six-phase, etc.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described our invention, what we claim as new and desire to secure by Letters Patent is:

1. In a dynamo electric machine, the combination comprising a magnetizable member provided with a series of pole portions, a second intermediate member relatively movable with respect to said magnetizable member and provided with a second series of pole portions cooperating with said first series to provide a plurality of local magnetic circuits, said second member also being provided with a series of winding receiving slots, a third member relatively movable with respect to said intermediate member and provided with a series of cooperating winding receiving slots, a source of alternating current, induction motor windings disposed respectively in each of said series of slots and connected to be energized from said source so as to produce motor propelling force between said second and third members, a magnetizing winding on said first named magnetizable member and wound about its pole portions and comprising sections connected to be excited from said source of alternating current in parallel with said motor windings, said sections being arranged to give bucking torques so as to produce a braking effect and when excited with a maximum valued current produce a slippage between said first and second members of substantially zero value, and controlling means for varying the exciting current supplied to said magnetizing winding.

2. In a dynamo electric machine, the combination comprising a magnetizable member provided with a series of pole portions, a second intermediate member relatively movable with respect to said magnetizable member and provided with a second series of pole portions cooperating with said first series to provide a plurality of local magnetic circuits, said second member also being provided with a series of winding receiving slots, a third member relatively movable with respect to said intermediate member and provided with a series of cooperating winding receiving slots, a single-phase source of alternating current, cooperating induction motor windings disposed respectively in each of said series of slots and connected to be energized from said source for producing a unidirectional propelling force between said second and third members, a magnetizing winding on said first named magnetizable member and wound about its pole portions and comprising sections connected to be excited from said source of alternating current in parallel with said motor windings, said sections being arranged to give bucking torques so as to produce a braking effect and when excited with a maximum valued current produce a slippage between said first and second members of substantially zero value, and controlling means for varying the exciting current supplied to said magnetizing winding.

3. In a dynamo electric machine, the combination comprising a magnetizable member provided with a series of pole portions, a second intermediate member relatively movable with respect to said magnetizable member and provided with a second series of pole portions cooperating with said first series to provide a plurality of local magnetic circuits, said second member also being provided with a series of winding receiving slots, a third member relatively movable with respect to said intermediate member and provided with a series of cooperating winding receiving slots, a three-phase source of alternating current, cooperating induction motor windings disposed respectively in each of said series of slots and connected to be energized from said source for producing a motor propelling force between said second and third members, a magnetizing winding on said first named magnetizable member and wound about its pole portions and comprising sections connected to be excited from said source of alternating current in parallel with said motor windings, said sections being connected in open-delta and arranged to give bucking torques so as to produce a braking effect and when excited with a maximum valued current produce a slippage between said first and second members of substantially zero value, and controlling means for varying the exciting current supplied to said magnetizing winding.

EDWIN J. LOCKWOOD.
JOHN H. FOSTER.